UNITED STATES PATENT OFFICE.

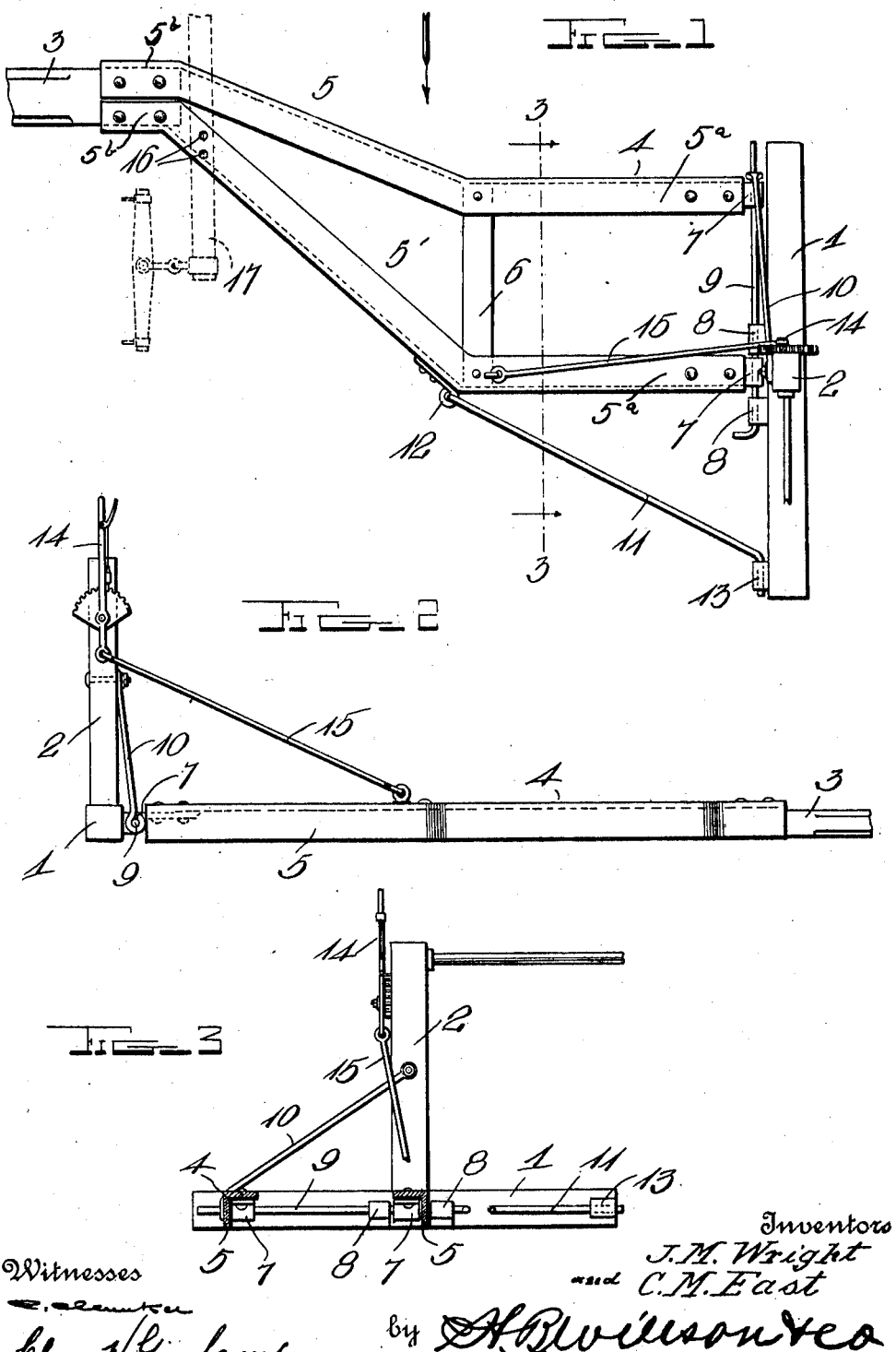

JOHN M. WRIGHT, OF BRAINARD, AND CHARLES M. EAST, OF VALPARAISO, NEBRASKA.

DRAFT-EQUALIZER.

988,845.  Specification of Letters Patent.  Patented Apr. 4, 1911.

Application filed November 17, 1909. Serial No. 528,456.

*To all whom it may concern:*

Be it known that we, JOHN M. WRIGHT, a citizen of the United States, residing at Brainard, Butler county, Nebraska, and CHARLES M. EAST, a citizen of the United States, residing at Valparaiso, in the county of Saunders and State of Nebraska, have invented certain new and useful Improvements in Draft-Equalizers; and we do declare the following to be a full, clear, and exact description of the invention, such as will enable others skilled in the art to which it appertains to make and use the same.

This invention relates to improvements in pole attaching means.

The object of the invention is to provide means whereby a pole is offset or turned to one side and adapted to be connected to a machine in such a manner that an equal number of draft animals may be hitched to each side of the pole, thus preventing the machine from running into the grain when used on a harvesting machine, such as is common when a straight pole is used and one horse placed on the grain side.

With this and other objects in view, the invention consists of certain novel features of construction, combination and arrangement of parts, as will be more fully described and particularly pointed out in the appended claim.

In the accompanying drawings, Figure 1 is a plan view of a portion of a grain binder showing the application of our invention thereto; Fig. 2 is a side elevation looking in the direction of the arrow in Fig. 1; and Fig. 3 is a transverse section on the line 3—3 of Fig. 1.

Referring more particularly to the drawings, 1 denotes a portion of the front end of a harvesting machine, and 2 denotes the reel supporting post upon which is revolubly mounted the usual grain reel, not shown. A pole 3 has the inner end thereof secured to the forward end of an angularly shaped frame 4, by means of which the tongue is connected to the machine in an offset position or to one side of the center of the machine, whereby the pole will be in the center of the team or in such position that an equal number of draft animals may be hitched on each side thereof.

The tongue attaching frame 4 is composed of two side bars 5 and 5', preferably formed of angle iron and each having end portions arranged on parallel lines, and an intermediate portion connecting said end portions and arranged at an angle thereto. The inner members 5ª of the bars are secured to the machine frame so as to extend forwardly therefrom in parallel relation and the intermediate portions of the bars are deflected laterally from the said parallel members in the same horizontal plane therewith at different angles so that they converge toward their front ends and bring the outer members 5ᵇ of the bars close together as shown. The said outer members 5ᵇ of the bars are parallel and are secured rigidly to the inner end of the pole so as to inclose and firmly support the same. A cross bar 6 is secured rigidly to and extends between the side bars at the front ends of the inner parallel members 5ª so as to thoroughly brace the structure and maintain the relative positions of the parts.

On the free ends of the parallel portions 5ª of the side bars 5 and 5' are arranged hinge members 7. The hinge member of the side bar 5 is pivotally connected with a coöperating hinge member 8 on the frame of the machine by a coupling pin or rod 9. The rod 9 is extended and has its free end engaged with the hinge member 7 of the other side bar 5' of the frame 4. The projecting end of the coupling rod 9, after passing through the hinge member on the side bar 5' is engaged with a bracing and supporting rod 10, the upper end of which is secured to the reel post 2, as shown. The frame 4 is further secured to the frame of the machine and braced by means of a diagonally arranged bracing rod 11, one end of which is connected to the inner end of the inclined arms of the member 5, as shown at 12, while the other end of the rod 11 is connected to the frame 1 of the machine by a keeper as shown at 13. On the upper end of the reel post 2 is arranged a tilting lever 14 provided with a pawl and ratchet holding mechanism of any suitable construction. The tilting lever is connected to the frame 4 by a connecting rod 15. By means of the tilting lever 14, the forward end of the machine may be tilted to bring the cutting bar and working parts of the machine to the desired angle.

In the outer portion of the frame 4 where the same connects with the inner end of the tongue is formed two or more laterally spaced bolt holes 16, which are provided to receive the pivot bolt of the double tree 17, which is shown in dotted lines in Fig. 1 of the drawings. By means of the holes 16 the double tree may be adjusted to the desired position to obtain the proper draft for the machine. To the end of the double tree are connected the usual swingletrees, as shown.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined in the appended claim.

Having thus described our invention, what we claim is:—

Means for securing a draft pole comprising a pair of side bars, each having end portions arranged in parallel planes and an intermediate laterally deflected portion connecting the end portions, the said intermediate portions of the side bars being deflected to the same side but disposed at different angles whereby they are caused to converge and the forward parallel portions of the bars are brought together to fit around the end of the pole, means for hinging the rear ends of the bars to a portable structure, a cross bar rigidly secured to and extending between the rear parallel portions of the side bars at the rear ends of the deflected portions of the bars, and a brace having its front end secured to the deflected side bar portion having the greater inclination, and its rear end hinged to the portable structure and spaced laterally from the said side bar.

In testimony whereof we have hereunto set our hands in presence of two subscribing witnesses.

JOHN M. WRIGHT.
CHARLES M. EAST.

Witnesses:
H. S. GRIFFIS,
A. O. KLEIN.

Copies of this patent may be obtained for five cents each, by addressing the "Commissioner of Patents, Washington, D. C."